(12) United States Patent
Huang

(10) Patent No.: US 9,008,410 B2
(45) Date of Patent: Apr. 14, 2015

(54) SINGLE DIE INSPECTION ON A DARK FIELD INSPECTION TOOL

(71) Applicant: KLA-Tencor Corporation, Milpitas, CA (US)

(72) Inventor: Tong Huang, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 188 days.

(21) Appl. No.: 13/801,135

(22) Filed: Mar. 13, 2013

(65) Prior Publication Data
US 2014/0270475 A1 Sep. 18, 2014

(51) Int. Cl.
G06K 9/00 (2006.01)
G06T 7/00 (2006.01)

(52) U.S. Cl.
CPC .................................. G06T 7/0004 (2013.01)

(58) Field of Classification Search
None
See application file for complete search history.

(56) References Cited

U.S. PATENT DOCUMENTS

| 4,707,610 | A | 11/1987 | Lindow et al. |
| 6,865,288 | B1 | 3/2005 | Shishido et al. |
| 7,440,607 | B1 * | 10/2008 | Lin et al. ........................ 382/149 |
| 7,659,975 | B1 | 2/2010 | Ramani et al. |
| 8,106,355 | B1 | 1/2012 | Lauber et al. |
| 8,126,255 | B2 | 2/2012 | Bhaskar et al. |
| 8,223,327 | B2 | 7/2012 | Chen et al. |
| 8,467,047 | B2 | 6/2013 | Chen et al. |
| 8,605,275 | B2 | 12/2013 | Chen et al. |
| 2002/0028013 | A1 | 3/2002 | Sawa et al. |
| 2004/0061850 | A1 | 4/2004 | Fisch et al. |
| 2004/0252879 | A1 | 12/2004 | Tiemeyer et al. |
| 2005/0110986 | A1 | 5/2005 | Nikoonahad et al. |
| 2006/0161452 | A1 | 7/2006 | Hess |
| 2006/0193507 | A1 * | 8/2006 | Sali et al. ........................ 382/145 |
| 2006/0262297 | A1 | 11/2006 | Matsui et al. |
| 2007/0230770 | A1 | 10/2007 | Kulkarni et al. |
| 2008/0032429 | A1 | 2/2008 | Chen et al. |
| 2008/0225286 | A1 | 9/2008 | Shibata et al. |
| 2008/0273193 | A1 | 11/2008 | Nishiyama et al. |
| 2009/0016595 | A1 | 1/2009 | Peterson et al. |
| 2009/0041332 | A1 | 2/2009 | Bhaskar et al. |
| 2009/0080759 | A1 | 3/2009 | Bhaskar et al. |

(Continued)

FOREIGN PATENT DOCUMENTS

| JP | 2008-241716 | 10/2008 |
| RU | 2305320 | 8/2007 |

(Continued)

OTHER PUBLICATIONS

International Search Report and Written Opinion for PCT/US2014/025133 mailed Jul. 24, 2014.

Primary Examiner — Daniel Mariam
(74) Attorney, Agent, or Firm — Ann Marie Mewherter

(57) ABSTRACT

Systems and methods for detecting defects on a wafer are provided. One method includes generating output for a wafer by scanning the wafer with a dark field inspection system. The method also includes generating first image data for the wafer using the output and a first cell size and second image data for the wafer using the output and a second cell size. In addition, the method includes combining the first image data and the second image data corresponding to substantially the same locations on the wafer thereby creating additional image data for the wafer. The method further includes detecting defects on the wafer using the additional image data.

37 Claims, 1 Drawing Sheet

(56) References Cited

U.S. PATENT DOCUMENTS

2011/0142327 A1 6/2011 Chen et al.
2013/0250287 A1 9/2013 Chen et al.

FOREIGN PATENT DOCUMENTS

| WO | 99/67626 | 12/1999 |
| WO | 2007/092950 | 8/2007 |

* cited by examiner

SINGLE DIE INSPECTION ON A DARK FIELD INSPECTION TOOL

BACKGROUND OF THE INVENTION

1. Field of the Invention

The present invention generally relates to systems and methods for detecting defects on a wafer.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Some currently available inspection systems are configured to inspect a wafer with more than one detection channel, to detect defects on the wafer by separately processing the data acquired by each of the channels, and to classify the defects by separately processing the data acquired by each of the channels. The defects detected by each of the individual channels may also be further processed separately, for example, by generating different wafer maps, each illustrating the defects detected by only one of the individual channels. The defect detection results generated by more than one channel of such a system may then be combined using, for example, Venn addition of the individual wafer maps. Such previously used inspection methods, therefore, do not leverage the output generated by the inspection system at the pixel level, but rather combine the results at the wafer map level as the final result.

Accordingly, it would be advantageous to develop methods and systems for detecting defects on a wafer that make better use of the inspection system output to provide increased defect detection sensitivity.

SUMMARY OF THE INVENTION

The following description of various embodiments is not to be construed in any way as limiting the subject matter of the appended claims.

One embodiment relates to a method for detecting defects on a wafer. The method includes generating output for a wafer by scanning the wafer with a dark field inspection system. The method also includes generating first image data for the wafer using the output and a first cell size and second image data for the wafer using the output and a second cell size. In addition, the method includes combining the first image data and the second image data corresponding to substantially the same locations on the wafer thereby creating additional image data for the wafer. The method further includes detecting defects on the wafer using the additional image data. Generating the first and second image data, combining the first and second image data, and detecting the defects are performed by a computer system.

Each of the steps of the method may be further performed as described herein. In addition, the method may include any other step(s) of any other method(s) described herein. Furthermore, the method may be performed by any of the systems described herein.

Another embodiment relates to a non-transitory computer-readable medium storing program instructions for causing a computer system to perform a computer-implemented method for detecting defects on a wafer. The method includes the steps described above, which may be further performed as described herein. In addition, the computer-implemented method may include any other step(s) of any other method(s) described herein. The computer-readable medium may be further configured as described herein.

An additional embodiment relates to a system configured to detect defects on a wafer. The system includes an inspection subsystem configured to generate output for a wafer by scanning the wafer and detecting light scattered from the wafer during the scanning. The system also includes a computer subsystem configured for generating the first and second image data, combining the first and second image data, and detecting the defects as described above. The system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
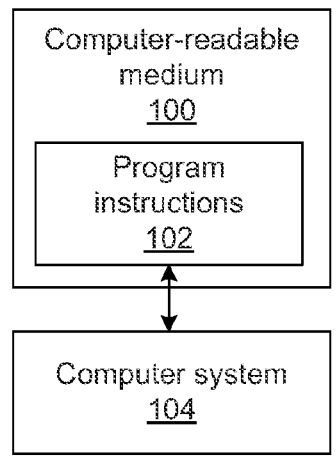
FIG. 1 is a block diagram illustrating one embodiment of a non-transitory computer-readable medium storing program instructions for causing a computer system to perform a computer-implemented method for detecting defects on a wafer.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein relate to single die inspection (SDI) on dark field (DF) wafer inspection tools. As described further above, defect inspection plays a key role in yield management of semiconductor wafer processing for integrated circuit (IC) manufacturing. Identifying if there is a defect can be based on wafer images obtained from optics systems. Inspection algorithms generally compare the intensity of target pixels to the intensity of reference pixels. Most DF inspection algorithms are three die, double-detection algorithms. That is, images are obtained from three adjacent dies—one target die and two reference dies, difference intensities are calculated between the target die and both of the reference dies, and then the two difference intensities are compared to a threshold to identify if there is a defect. One disadvantage of such methods is that, if defects are repeaters existing at corresponding locations on all dies, then the defects will be missed by die-to-die subtraction. There are also some other disadvantages for multiple die inspection when there is relatively strong die-to-die color variation or residual mis-registration from die-to-die runtime alignment. These factors contribute to noise in die-to-die type inspections.

Inspecting defects in a single die may avoid these issues. For example, unlike common multiple die (or die-to-die) inspection approaches in which the references are from adjacent dies, as described further herein, SDI applies reference pixels in the same die as the target pixels but adjacent cells. In concept, SDI is similar to bright field (BF) array mode (cell-to-cell inspection). However, in DF systems, due to system resolution and hardware limitations, imaging the cell size on the wafer onto an integral number of detector pixels cannot be easily achieved for SDI inspection. The cell fusion techniques described further herein have been invented to make SDI work well for DF inspection systems. In addition, the embodiments described herein increase the inspection sensitivity for semiconductor wafer inspection systems including DF inspection systems by use of a single die.

One embodiment relates to a method for detecting defects on a wafer. The method includes generating output for a wafer by scanning the wafer with a DF inspection system. The output generated by scanning the wafer may include any suitable output and may vary depending on the configuration of the inspection system and/or the inspection recipe used to perform the scanning. For example, the output may include signals, data, images, or image data responsive to light scattered from the wafer (e.g., in the case of DF inspection systems).

The inspection system may be a commercially available inspection system such as the Puma 91xx series tools, which are commercially available from KLA-Tencor, Milpitas, Calif. The inspection system may be configured for DF inspection, possibly in combination with one or more other inspection modes (e.g., an aperture mode of inspection). Furthermore, the inspection system may be configured as a light-based inspection system. Scanning the wafer with the inspection system may be performed in any suitable manner. For example, the wafer may be moved (by a stage of the inspection system) with respect to optics of the inspection system such that the illumination of the inspection system traces a path over the wafer as light scattered from the wafer is detected. The inspection system used in the method may be further configured as described herein.

The method also includes generating first image data for the wafer using the output and a first cell size and second image data for the wafer using the output and a second cell size. In one embodiment, the first and second image data includes difference image data, and generating the difference image data includes subtracting the output generated for one cell in a die on the wafer from the output generated for another cell in the die. In this manner, unlike common multiple die (or die-to-die) inspection approaches in which the reference images are from adjacent dies, SDI applies reference pixels from the same die but different cells. The first and second cell sizes may be determined as described further herein.

The method also includes combining the first image data and the second image data corresponding to substantially the same locations on the wafer thereby creating additional image data for the wafer. In this manner, the first and second image data may be combined on a location-to-location basis. Combining the first image data and the second image data as described herein creates different image data for the wafer, which can then be used as described further herein (e.g., for defect detection). For example, combining the first and second image data may include performing "image fusion" using the first image data and the second image data. In other words, new image data of the wafer may be "fused" from two other image data of the wafer. In addition, since the first and second image data are generated for cells having different cell sizes, the fusing step described herein may be referred to as "cell fusion."

Although the embodiments are described herein with respect to combining first and second image data having different cell sizes, the combining step may include combining more than two image data, at least some of which have different cell sizes. For example, the method may include generating third and/or fourth image data for the wafer using the output and third and fourth cell sizes. In such embodiments, the combining step may include combining some combination of the first, second, third, and fourth image data, and at least some of the first, second, third, and fourth cell sizes are different.

The combining step is unlike other inspection processes in which image data from one location on a wafer is subtracted from image data for another, corresponding location on the wafer that is different from the first location. For example, in die-to-die inspections, image data from one die may be subtracted from image data from another die. Such image data may correspond to each other in that the data is generated for corresponding locations in the two dies, but those corresponding locations are actually at different locations on the wafer. In other words, the image data that is subtracted from other image data may have substantially the same within die locations, but different wafer locations. In a similar manner, image data that is subtracted from other image data for cell-to-cell inspection may have substantially the same within cell locations, but different wafer locations since the cells are adjacent to one another on the wafer. Therefore, cell-to-cell and die-to-die inspection do not combine image data generated at substantially the same wafer locations. In addition, the combining step described herein may include performing some function on the data being combined other than subtraction.

In one embodiment, combining the first image data and the second image data includes performing image correlation on the first image data and the second image data corresponding to substantially the same locations on the wafer. For example, new wafer image data or the fused image data may be generated by correlating image data. The image correlation may be performed in any suitable manner using any suitable image correlation algorithm(s) and/or method(s). In addition, the image correlation may be performed using any suitable image processing technique that can be used for image correlation.

In another embodiment, combining the first image data and the second image data is performed at the pixel level of the first and second image data. In other words, the first and second image data may be combined on a pixel-by-pixel basis. In still other words, combining the first and second image data may be performed separately for individual pixels in the first and second image data. By fusing information at the pixel level, one can leverage both magnitude (intensity) and phase (correlation) information.

In an additional embodiment, defect detection is not performed prior to the combining step. For example, defect detection cannot be performed using the additional image data until after the combining step in which the additional image data is created has been performed. In this manner, unlike methods and systems that involve combining information generated after defect detection (e.g., combining defect detection results from different scans of a wafer), the embodiments described herein combine information prior to defect detection, which is advantageous as described further herein.

In one embodiment, the first and second image data is generated for a region of a die on the wafer containing repeating patterned features that are visible in the output. In one such embodiment, the region is not an array region of the die. For example, in the periphery region with repeating patterned features, the cell can be seen as the repeating pattern. Therefore, SDI as described herein may be performed in a periphery, or other non-array, region of dies formed on a wafer having a repeating pattern.

In some embodiments, the method includes determining the first and second cell sizes by selecting a portion of the output in which at least some of the repeating patterned features are visible, calculating correlation values for different offsets between the portion of the output and itself, and selecting two of the different offsets having the highest correlation values as the first and second cell sizes. For example, in setup, a sample image in the region with a repeating pattern can be selected. To find the cell sizes, a correlation can be determined by shifting the sample image in integral numbers of pixels with respect to itself. Therefore, correlation values can be calculated by shifting the sample in integral numbers of pixels. As such, the correlation values may be determined as a function of offset numbers of pixels, and the number of pixels corresponding to the biggest peaks in a graph of the correlation values (or the largest correlation values determined by any other comparison method) may be selected as cell sizes.

The embodiments described herein are, therefore, substantially different than currently used DF inspection methods. For example, in current DF inspection methods, existing array mode algorithms may be used for inspection of one die. However, current DF array modes are limited to relatively quiet array regions, and the local intensity comparison is limited to a fixed 5 pixel×5 pixel neighborhood. In contrast, as described herein, SDI may be performed in relatively noisy regions of the wafer (e.g., periphery or other regions in which repeating patterned features are visible in the output or regions that otherwise contain a substantial amount of pattern noise) because the cell fusion techniques described herein advantageously reduce or suppress the noise in the difference images that are fused. In addition, the cell sizes used in the methods described herein are not fixed and can be determined on a wafer-to-wafer basis or region-to-region basis on a single wafer as described herein (e.g., by selecting a portion of the output, calculating correlation values, and selecting two or more of the different offsets as described herein). Therefore, the embodiments described herein are advantageously adaptable to many different wafers, regions, and repeating patterned features.

In one embodiment, the first and second cell sizes are different than an actual cell size in the region of the die. For example, due to resolution limitations of DF optical systems, the real cell size in general cannot be guaranteed to be an integral number of pixels. Therefore, the cell sizes selected for use in the embodiments described herein will almost always be different than actual cell sizes on the wafer.

In another embodiment, a number of pixels of a detector across which at least one of the first and second cell sizes is imaged by the inspection system is not an integer. For example, due to the limitations of optics resolution, the pitch size of the repeating pattern usually is a non-integral number of pixels. In particular, due to resolution limitations of DF inspection systems, the real cell size in general cannot be guaranteed to be an integral number of pixels, so the cell sizes selected from the correlation values (e.g., the peaks) can be approximations with sub-pixel error to the real cell size. The sub-pixel error of cell size will cause pattern noise in cell-to-cell subtraction. For example, the approximated cell size can lead to residual pattern noise in difference images generated with both of the first and second cell sizes. The different approximated cell sizes selected from the highest correlation values (e.g., the peaks) can cause different residual noise patterns in the difference images. However, the real defect signal is not impacted much from the different cell sizes. To overcome this difficulty, the cell fusion technique described herein can be used to suppress pattern and random noise when doing cell-to-cell comparisons with non-integral cell or pitch sizes. For example, two or more difference images corresponding to different cell sizes can be fused to reduce the pattern noise. The fusion keeps the defect signal while canceling out the residual noise with different patterns.

The embodiments described herein are, therefore, substantially different than currently used BF inspection methods. For example, in current BF inspection methods, array mode inspection may involve cell comparisons which requires hardware providing substantially accurate cell size. In this manner, the patterned features in different cells can be aligned with one another thereby allowing defect detection without substantial noise or nuisance detection. However, providing substantially accurate cell size is not feasible in current DF hardware systems. Therefore, that the embodiments described herein can handle inaccuracies in the cell sizes used, without detecting substantial noise or nuisance, due to the cell fusion techniques enables cell-to-cell comparisons within single die to be used for DF wafer inspection.

The SDI embodiments described herein can include the cell fusion described above in combination with channel fusion. For example, in some embodiments, the first and second image data is generated using the output generated by a first channel of the inspection system. The term "channel" is generally used herein to refer to different detection subsystems or detectors of the inspection system, which may be different in angles (i.e., scattering angles) at which light from the wafer is detected by the detection subsystems or detectors, but which may or may not be different in other respects as well (e.g., wavelength(s) at which light is detected by the channels, polarization of the light detected by the channels, etc.).

In one such embodiment, the method includes generating third image data for the wafer using the output generated by a second channel of the inspection system and a third cell size and fourth image data for the wafer using the output generated by the second channel and a fourth cell size, combining the third and fourth image data corresponding to the substantially the same locations on the wafer thereby creating further image data for the wafer, combining the additional image data and the further image data corresponding to the substantially the same locations on the wafer thereby creating other image data for the wafer, and detecting defects on the wafer using the other image data. In this manner, difference images generated for SDI with cell fusion from different channels can be further fused to suppress random noise and boost the signal-to-noise ratio. For example, cell fusion may be separately performed for channel 1, channel 2, and channel 3 of an inspection system. Therefore, different additional image data can be generated as described herein for each of these channels. In other words, three different difference images may be generated, one for each of the channels, for SDI with cell fusion. Different combinations of the additional image data can then be generated to perform channel fusion. For example, the additional image data for channel 1 and channel 2 can be combined to create other image data, and the additional image data for channel 1, channel 2, and channel 3 can also be combined to create other image data. In this manner, additional image data for two or more channels (e.g., two or three or more channels) may be combined to create the other image data. The results of each of the channel fusions can be used separately or in combination for defect detection. In this manner, cell fusion can be combined with channel fusion to further suppress random noise and boost the signal-to-noise ratio.

The cell sizes that are used for each of the channels may be the same or different. For example, the third and fourth cell sizes used for the second channel may be different than both of the first and second cell sizes used for the first channel. However, the cell sizes used for each channel may be selected independently for each channel as described herein and therefore while the third and fourth cell sizes for the second channel may be different from each other, they may or may not be different than the first and second cell sizes of the first channel.

The method further includes detecting defects on the wafer using the additional image data. The defects detected on the wafer using the additional image data may include any defects known in the art and may vary depending on one or more characteristics of the wafer (e.g., the wafer type or the process performed on the wafer prior to inspection). Detecting the defects using the additional image data may include applying one or more defect detection thresholds to the additional image data. For example, the additional image data may be compared to one or more defect detection thresholds. The one or more defect detection thresholds can be used to make a decision regarding whether a pixel in the additional image data is defective or not.

One or more defect detection thresholds that are used to detect the defects on the wafer may be defect detection threshold(s) of one or more defect detection algorithms, which may be included in an inspection recipe. The one or more defect detection algorithms that are applied to the additional image data may include any suitable defect detection algorithm(s) and may vary depending on, for example, the type of inspection that is being performed on the wafer. Examples of suitable defect detection algorithms, which can be applied to the additional image data, include segmented auto-thresholding (SAT) or multiple die auto-thresholding (MDAT), which are used by commercially available inspection systems such as those from KLA-Tencor. In this manner, the additional image data may be treated as any other image data when it comes to defect detection.

If the defect detection algorithm includes separating the output of the wafer into segments for which defect detection is separately performed, the SDI described herein may be performed for all of the segments or only some of the segments. In addition, if defect detection is performed using more than one channel of the inspection system, SDI described herein may be performed for only some of the channels (i.e., fewer than all of the channels included in the system) or all of the channels of the inspection system. A user can select the segments and/or channels for which SDI will be performed during setup of the wafer inspection recipe.

SDI described herein can also be performed for one or more care area groups (CAGs) if CAGs are used by the defect detection method or algorithm. For example, during SDI setup, if CAGs are selected for SDI, the embodiments described herein may automatically place images boxes for SDI and show the image boxes to a user in a CA die view. The embodiments may then grab and measure cell size by grabbing images at the image box locations. In addition, the embodiments may also measure repeating pattern direction, horizontal or vertical, and measure if there is a visible repeating pattern or not (e.g., in the array regions). Using the grabbed images for the CAGs and the segmentation recipe that will be used for defect detection, the embodiments may also determine pitch sizes, the type of pitch, correlation values, and consistency along with the original and processed SDI images. A user can modify the image boxes, re-grab images, and re-measure cell size if the results are not optimal. The embodiments may then display the original or processed SDI images, which can be overlaid with CA boxes and segments.

One or more steps of the method may be performed by a computer system. For example, generating the first and second image data, combining the first and second image data, and detecting the defects described above are performed by a computer system, which may be further configured as described herein.

In an embodiment, noise in the first image data is uncorrelated with noise in the second image data. In one embodiment, the additional image data has less pattern noise than the first and second image data. For example, by performing the image correlation as described above, pattern noise in the first image data and the second image data that is non-spatially coincident can be substantially eliminated in the additional image data. In particular, the approximated cell sizes described herein may lead to residual pattern noise in the difference images, but the two different approximated cell sizes selected as described herein cause different residual noise patterns in the difference images. Therefore, the two difference images can be fused to reduce or suppress the pattern noise.

In one embodiment, portions of the additional image data that correspond to the defects have greater signal-to-noise ratios (S/Ns) than portions of the first and second image data that are combined to create the portions of the additional image data. For example, the cell fusion described above can keep the defect signal, which is not impacted much by the different cell sizes, while cancelling out or suppressing the residual noise with different patterns. In addition, by combining (or fusing) information at the pixel level, weak signal strengths from defects of interest (DOI) may be enhanced because the noise is greatly suppressed. For example, fusing information at the pixel level thereby leveraging both magnitude (intensity) and phase (correlation) information allows one to extract defects with weak signals by suppressing noise and nuisance events through exploitation of their respective coincidence and non-coincidence. In this manner, one advantage of the embodiments described herein is that pattern noise can be greatly reduced in the additional image data compared to the first and second image data while defect S/Ns in the additional image data are improved compared to the first and second image data. As such, a defect that is not detectable in either of the first and second image data may become detectable in the corresponding additional image data created by image correlation.

However, the embodiments described herein can be used to increase the S/Ns for defects that are detectable in either one or both of the first and second image data individually. For example, even if a defect produces a moderate S/N in one of the first or second image data and a feeble S/N in another of the first or second image data, the defect S/N in the additional image data can be increased relative to both the first and second image data because fusing the information can greatly suppress noise. In addition, different peak noise events may be present in first and second image data, but a defect may have sufficient correlation in the first and second image data such that by combining the first and second image data as described herein, the S/N of the defect can be dramatically higher in the additional image data compared to the first and second image data. In this manner, the embodiments described herein may be used to enhance the detectability of DOI for wafer inspection systems.

In one embodiment, the first and second image data is generated for a region of a die on the wafer that is not an array region of the die, generating the output includes generating output in the array region, and the method includes detecting defects in the array region by subtracting the output for one cell in the array region of the die from the output for another cell in the array region of the die and applying one or more defect detection parameters to results of the subtracting. Therefore, SDI may be performed in the array region of dies formed on a wafer. In addition, the SDI that is performed in array regions may be different than the SDI that is performed in non-array regions although the output for the array and non-array regions may be generated in the same scan(s) using the same channel(s). For example, as described above, SDI in non-array regions having repeating patterned features that are visible in the output of the inspection system may include cell fusion, while SDI performed in array regions may not include cell fusion.

In some embodiments, repeating patterned features in the array region are not visible in the output generated in the array region. For example, repeating patterned features may be present in the array region, but the DF inspection system may be configured to eliminate the signals or data from the repeating patterned features using either optical means (e.g., a Fourier or spatial filter) or electronic means (e.g., using a signal or data processing filter). As such, SDI may be performed in array regions without pattern. Since repeating patterned features may not be visible in output generated for the array region, the output generated for the array region and difference images generated from such output may not contain a substantial amount of pattern or other noise. Therefore, cell fusion may not be needed for the array region.

In another embodiment, a cell size of the one cell and the other cell is selected to be greater than an expected size of the defects being detected in the array region and not equal to a distance between adjacent repeating defects in the array region. For example, in the DF array region, the cell can be treated as any small size (as long as it is larger than the defect size) theoretically since there is no visible pattern in the DF array region. In particular, for array regions, the defect detection will not be sensitive to the pitch or cell size selection as long as the pitch or cell size is greater than a defect size (which in most real world cases will be substantially small for DOIs). In one example, if the distance between two adjacent repeaters is, say, 20 pixels, then for SDI in the array region, the cell size may be set at 4 pixels. However, the cell size is flexible and may vary from that in the example above to 3 pixels or 5 pixels without much change in performance as long as the cell size is not equal to the distance between two adjacent defects, e.g., 20 pixels. In this manner, in the array regions, the embodiments described herein can select cell size flexibly based on the real situation on the wafer instead of a fixed one.

In a further embodiment, the one cell and the other cell have the same cell size. For example, in the array region unlike in non-array regions, the cells that are subtracted from one another may have the same cell size. In addition, the cell size used in the array regions may be different from all of the cell sizes used for non-array regions. However, the cell sizes used in the array and non-array regions may be selected independent of each other and therefore may or may not be different.

The embodiments described herein are, therefore, substantially different than currently used DF inspection methods. For example, in current DF inspection methods, existing array mode algorithms may be used for inspection of one die. However, current DF array modes are limited to relatively quiet array regions and the local intensity comparison is limited to a fixed 5 pixel×5 pixel neighborhood. In contrast, as described herein, SDI may be used in relatively quiet array regions and the cell size may be selected based on the wafer being inspected and the defects that will be detected thereon. For example, as described above, the cell size may be selected based on the distance between repeating defects that are on the wafer such that the cell size that is used enables detection of those repeating defects. In addition, the cell sizes used for comparisons in the array regions are not fixed and can be determined on a wafer-to-wafer basis as described herein (e.g., based on the distance between adjacent repeating defects in the array region). Therefore, the embodiments described herein are advantageously adaptable to many different wafers and repeating defects.

In some embodiments, the defects that are detected in the array region include defects that are located at substantially the same position in multiple dies on the wafer. In this manner, at least some of the defects detected in the array region may include "repeaters" or "repeating defects," in that the defects repeat at the same or substantially the same location in multiple dies (or every die) on the wafer. If the defects are repeaters existing at corresponding locations in all dies, then the defects will be missed by die-to-die subtraction. However, if the cell size is set as described above, then all defects, including repeating defects, beyond the noise floor (i.e., all defects having signals greater than the noise signals) can be caught by the embodiments described herein.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Another embodiment relates to a non-transitory computer-readable medium storing program instructions for causing a computer system to perform a computer-implemented method for detecting defects on a wafer. One such embodiment is shown in FIG. 1. For example, as shown in FIG. 1, non-transitory computer-readable medium 100 contains program instructions 102 for causing computer system 104 to perform a computer-implemented method for detecting defects on a wafer. The computer-implemented method includes acquiring output for a wafer generated by scanning the wafer with a DF inspection system. Acquiring the output may include scanning the wafer with the DF inspection system or acquiring the output from a computer-readable storage medium (such as a fab database or a virtual inspector (VI)) in which the output has been stored. The computer-implemented method also includes the steps of generating the first and second image data, combining the first and second image data, and detecting the defects described above. The computer-implemented method for which the program instructions are executable may include any other step(s) described herein.

Program instructions 102 implementing methods such as those described herein may be stored on non-transitory computer-readable medium 100. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using Matlab, Visual Basic, ActiveX controls, C, C++ objects, C#, JavaBeans, Microsoft Foundation Classes ("MFC"), or other technologies or methodologies, as desired.

Computer system 104 may take various forms, including a personal computer system, mainframe computer system, workstation, system computer, image computer, programmable image computer, parallel processor, or any other device known in the art. In general, the term "computer system" may be broadly defined to encompass any device having one or more processors, which executes instructions from a memory medium.

Figure 2:
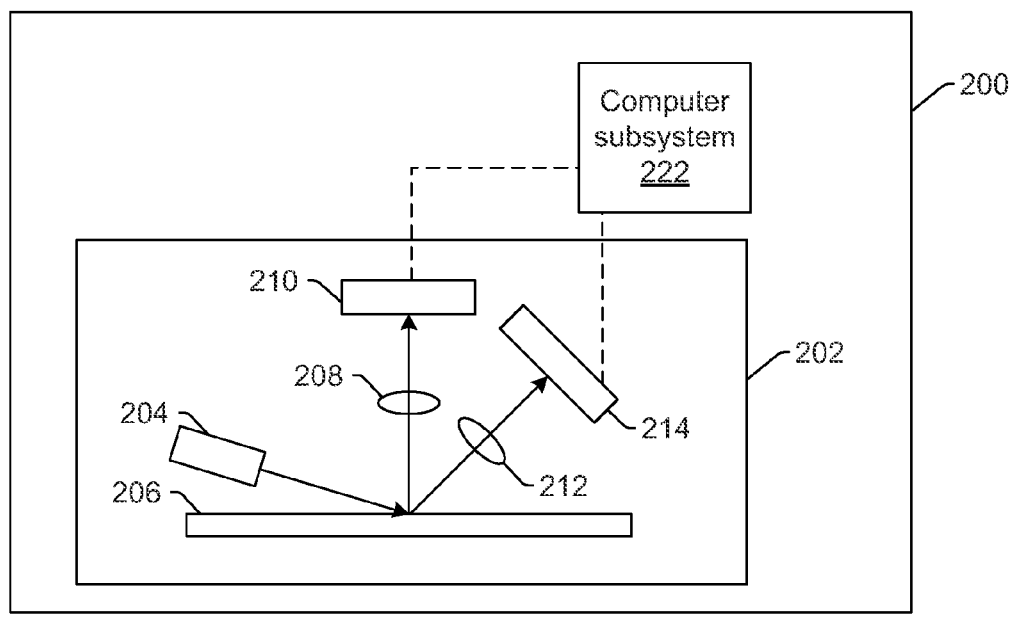
FIG. 2 is a schematic diagram illustrating a side view of an embodiment of a system configured to detect defects on a wafer.

An additional embodiment relates to a system configured to detect defects on a wafer. One embodiment of such a system is shown in FIG. 2. As shown in FIG. 2, system 200 includes inspection subsystem 202 and computer subsystem 222. The inspection subsystem is configured to generate output for a wafer by scanning the wafer and detecting light scattered from the wafer during the scanning. For example, as shown in FIG. 2, the inspection subsystem includes light source 204. Light source 204 may include any suitable light source known in the art such as a laser.

Light from the light source may be directed to wafer 206. The light source may be coupled to any other suitable elements (not shown) such as one or more condensing lenses, collimating lenses, relay lenses, objective lenses, apertures, spectral filters, polarizing components and the like. As shown in FIG. 2, the light may be directed to the wafer at an oblique angle of incidence. However, the light may be directed to the wafer at any suitable angle of incidence including near normal and normal incidence. In addition, the light or multiple light beams may be directed to the wafer at more than one angle of incidence sequentially or simultaneously. The inspection subsystem may be configured to perform the scanning by scanning the light over the wafer in any suitable manner.

Light scattered from wafer 206 may be collected and detected by one or more of multiple channels of the inspection subsystem during scanning. For example, light scattered from wafer 206 at angles relatively close to normal may be collected by lens 208. Lens 208 may include a refractive optical element as shown in FIG. 2. In addition, lens 208 may include one or more refractive optical elements and/or one or more reflective optical elements. Light collected by lens 208 may be directed to detector 210. Detector 210 may include any suitable detector known in the art such as a charge coupled device (CCD) or another type of imaging detector. Detector 210 is configured to generate output that is responsive to the scattered light collected by lens 208. Therefore, lens 208 and detector 210 form one channel of the inspection subsystem. This channel of the inspection subsystem may include any other suitable optical components (not shown) known in the art such as a Fourier filtering component.

Light scattered from wafer 206 at different angles may be collected by lens 212. Lens 212 may be configured as described above. Light collected by lens 212 may be directed to detector 214, which may be configured as described above. Detector 214 is configured to generate output that is responsive to the scattered light that is collected by lens 212. Therefore, lens 212 and detector 214 may form another channel of the inspection subsystem. This channel may also include any other optical components (not shown) described above. In some embodiments, lens 212 may be configured to collect light scattered from the wafer at polar angles from about 20 degrees to about 70 degrees. In addition, lens 212 may be configured as a reflective optical component (not shown) that is configured to collect light scattered from the wafer at azimuthal angles of about 360 degrees.

The inspection subsystem shown in FIG. 2 may also include one or more other channels (not shown). For example, the inspection subsystem may include an additional channel, which may include any of the optical components described herein such as a lens and a detector, configured as a side channel. The lens and the detector may be further configured as described herein. In one such example, the side channel may be configured to collect and detect light that is scattered out of the plane of incidence (e.g., the side channel may include a lens, which is centered in a plane that is substantially perpendicular to the plane of incidence, and a detector configured to detect light collected by the lens).

Output generated by the detector(s) during scanning may be provided to computer subsystem 222. For example, the computer subsystem may be coupled to each of the detectors (e.g., by one or more transmission media shown by the dashed lines in FIG. 2, which may include any suitable transmission media known in the art) such that the computer subsystem may receive the output generated by the detectors. The computer subsystem may be coupled to each of the detectors in any suitable manner. The output generated by the detectors during scanning of the wafer may include any of the output described herein.

The computer subsystem is configured for performing steps described herein including generating the first and second image data for the wafer, combining the first and second image data, and detecting the defects, which may be performed as described further herein. The computer subsystem may be configured to perform any other step(s) of any method embodiment(s) described herein. The computer subsystem may be further configured as described herein. The inspection subsystem may also be further configured as described herein. Furthermore, the system may be further configured as described herein.

It is noted that FIG. 2 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the Puma 9000 and 91xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, systems and methods for detecting defects on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for detecting defects on a wafer, comprising:
   generating output for a wafer by scanning the wafer with a dark field inspection system;
   generating first image data for the wafer using the output and a first cell size and second image data for the wafer using the output and a second cell size;
   combining the first image data and the second image data corresponding to substantially the same locations on the wafer thereby creating additional image data for the wafer; and
   detecting defects on the wafer using the additional image data, wherein generating the first and second image data, combining the first and second image data, and detecting the defects are performed by a computer system.

2. The method of claim 1, wherein the first and second image data comprises difference image data, and wherein generating the difference image data comprises subtracting the output generated for one cell in a die on the wafer from the output generated for another cell in the die.

3. The method of claim 1, wherein the first and second image data is generated for a region of a die on the wafer containing repeating patterned features that are visible in the output.

4. The method of claim 3, wherein the region is not an array region of the die.

5. The method of claim 3, further comprising determining the first and second cell sizes by selecting a portion of the output in which at least some of the repeating patterned features are visible, calculating correlation values for different offsets between the portion of the output and itself, and selecting two of the different offsets having the highest correlation values as the first and second cell sizes.

6. The method of claim 5, wherein the first and second cell sizes are different than an actual cell size in the region of the die.

7. The method of claim 5, wherein a number of pixels of a detector across which at least one of the first and second cell sizes is imaged by the inspection system is not an integer.

8. The method of claim 1, wherein the first and second image data is generated using the output generated by a first channel of the inspection system, and wherein the method further comprises generating third image data for the wafer using the output generated by a second channel of the inspection system and a third cell size and fourth image data for the wafer using the output generated by the second channel and a fourth cell size, combining the third and fourth image data corresponding to the substantially the same locations on the wafer thereby creating further image data for the wafer, combining the additional image data and the further image data corresponding to the substantially the same locations on the wafer thereby creating other image data for the wafer, and detecting defects on the wafer using the other image data.

9. The method of claim 1, wherein said combining comprises performing image correlation on the first image data and the second image data corresponding to the substantially the same locations on the wafer.

10. The method of claim 1, wherein said combining is performed at the pixel level of the first and second image data.

11. The method of claim 1, wherein noise in the first image data is uncorrelated with noise in the second image data.

12. The method of claim 1, wherein the additional image data has less pattern noise than the first and second image data.

13. The method of claim 1, wherein portions of the additional image data that correspond to the defects have greater signal-to-noise ratios than portions of the first and second image data that are combined to create the portions of the additional image data.

14. The method of claim 1, wherein the first and second image data is generated for a region of a die on the wafer that is not an array region of the die, wherein generating the output comprises generating output in the array region, and wherein the method further comprises detecting defects in the array region by subtracting the output for one cell in the array region of the die from the output for another cell in the array region of the die and applying one or more defect detection parameters to results of the subtracting.

15. The method of claim 14, wherein repeating patterned features in the array region are not visible in the output generated in the array region.

16. The method of claim 14, wherein a cell size of the one cell and the other cell is selected to be greater than an expected size of the defects being detected in the array region and not equal to a distance between adjacent repeating defects in the array region.

17. The method of claim 14, wherein the one cell and the other cell have the same cell size.

18. The method of claim 14, wherein the defects that are detected in the array region comprise defects that are located at substantially the same position in multiple dies on the wafer.

19. A non-transitory computer-readable medium storing program instructions for causing a computer system to perform a computer-implemented method for detecting defects on a wafer, wherein the computer-implemented method comprises:
   acquiring output for a wafer generated by scanning the wafer with a dark field inspection system;
   generating first image data for the wafer using the output and a first cell size and second image data for the wafer using the output and a second cell size;
   combining the first image data and the second image data corresponding to substantially the same locations on the wafer thereby creating additional image data for the wafer; and
   detecting defects on the wafer using the additional image data.

20. A system configured to detect defects on a wafer, comprising:
   an inspection subsystem configured to generate output for a wafer by scanning the wafer and detecting light scattered from the wafer during the scanning; and a computer subsystem configured for generating first image data for the wafer using the output and a first cell size and second image data for the wafer using the output and a second cell size, combining the first image data and the second image data corresponding to substantially the same locations on the wafer thereby creating additional image data for the wafer, and detecting defects on the wafer using the additional image data.

21. The system of claim 20, wherein the first and second image data comprises difference image data, and wherein generating the difference image data comprises subtracting the output generated for one cell in a die on the wafer from the output generated for another cell in the die.

22. The system of claim 20, wherein the first and second image data is generated for a region of a die on the wafer containing repeating patterned features that are visible in the output.

23. The system of claim 22, wherein the region is not an array region of the die.

24. The system of claim 22, wherein the computer subsystem is further configured for determining the first and second cell sizes by selecting a portion of the output in which at least some of the repeating patterned features are visible, calculating correlation values for different offsets between the portion of the output and itself, and selecting two of the different offsets having the highest correlation values as the first and second cell sizes.

25. The system of claim 24, wherein the first and second cell sizes are different than an actual cell size in the region of the die.

26. The system of claim 24, wherein a number of pixels of a detector across which at least one of the first and second cell sizes is imaged by the inspection subsystem is not an integer.

27. The system of claim 20, wherein the first and second image data is generated using the output generated by a first channel of the inspection subsystem, and wherein the computer subsystem is further configured for generating third image data for the wafer using the output generated by a second channel of the inspection subsystem and a third cell size and fourth image data for the wafer using the output generated by the second channel and a fourth cell size, combining the third and fourth image data corresponding to the substantially the same locations on the wafer thereby creating further image data for the wafer, combining the additional image data and the further image data corresponding to the substantially the same locations on the wafer thereby creating other image data for the wafer, and detecting defects on the wafer using the other image data.

28. The system of claim 20, wherein said combining comprises performing image correlation on the first image data and the second image data corresponding to the substantially the same locations on the wafer.

29. The system of claim 20, wherein said combining is performed at the pixel level of the first and second image data.

30. The system of claim 20, wherein noise in the first image data is uncorrelated with noise in the second image data.

31. The system of claim 20, wherein the additional image data has less pattern noise than the first and second image data.

32. The system of claim 20, wherein portions of the additional image data that correspond to the defects have greater signal-to-noise ratios than portions of the first and second image data that are combined to create the portions of the additional image data.

33. The system of claim 20, wherein the first and second image data is generated for a region of a die on the wafer that is not an array region of the die, wherein the inspection subsystem is further configured to generate the output by generating output in the array region, and wherein the computer subsystem is further configured for detecting detects in the array region by subtracting the output for one cell in the array region of the die from the output for another cell in the array region of the die and applying one or more defect detection parameters to results of the subtracting.

34. The system of claim 33, wherein repeating patterned features in the array region are not visible in the output generated in the array region.

35. The system of claim 33, wherein a cell size of the one cell and the other cell is selected to be greater than an expected size of the defects being detected in the array region and not equal to a distance between adjacent repeating defects in the array region.

36. The system of claim 33, wherein the one cell and the other cell have the same cell size.

37. The system of claim 33, wherein the defects that are detected in the array region comprise defects that are located at substantially the same position in multiple dies on the wafer.

* * * * *